KEYBOARD SELECTION SYSTEM

Original Filed May 27, 1966

3 Sheets-Sheet 1

INVENTORS
EDWARD S. OLSEN
ROBERT W. LOVE

BY Joseph J. Connerton
ATTORNEY 3,492,648
KEYBOARD SELECTION SYSTEM
Edward S. Olsen, Kingston, and Robert W. Love, Rhinebeck, N.Y., assignors to International Business Machines Corporation, a corporation of New York
Continuation of application Ser. No. 553,467, May 27, 1966. This application Apr. 9, 1969, Ser. No. 816,167
Int. Cl. H04q 1/00, 1/18; G08b 23/00
U.S. Cl. 340—147 7 Claims

ABSTRACT OF THE DISCLOSURE

A priority selection system for allocating service to a plurality of display stations includes a plurality of keyboard terminals, each having a delay line for storing the keyed characters and a control signal. Operation of a keyboard generates a strobe signal which is logically combined with the control signal from the associated delay line to allocate service to the specified keyboard and inhibit service to the remaining keyboards. Where both service request and the control signal from two or more terminals occurs simultaneously, service is allocated on the basis of the assigned address of the associated keyboards.

This is a continuation of Ser. No. 553,467, filed May 27, 1966 and now abandoned.

The present invention relates generally to priority systems and more particularly to a system for allocating priority between a plurality of terminal display devices.

In prior art types of terminal display systems which utilize a single message composer to convert coded digital signals from one or more keyboards to video signals for visible presentation on one or more associated display devices, it was customary for a given one of a plurality of terminals to monopolize the composer for an entire message, and service was provided on a predetermined inquiry basis. Thus, for example, if a number of terminals desired to use the composer at substantially the same time, one terminal would be selected to transmit its entire message and the remainder would wait. Next, one of the remaining stations would be selected to transmit its entire message while the remaining terminals would wait, and so on until all terminals had been serviced. The limitations and inefficiency of predetermined priority systems of this type are obvious, and the problem increases directly with the number of terminals involved.

In later versions of message composers, arrangements were provided wherein a composer was allocated on a single symbol basis to each one of a plurality of terminals in turn through a predetermined polling circuit. A symbol is a letter, numeral or special character. A system of this type is disclosed in copending application Ser. No. 512,106, "Improved Display System" filed by John L. Botjer et al. on Dec. 7, 1965, now U.S. Patent 3,453,384. While the system of the above disclosed type constituted a substantial improvement over previous known devices of the prior art, a terminal on the lower end of the polling chain requiring service would wait while the system was doing a polling routine on those devices having neither data to transmit nor a request for service.

In accordance with the present invention, there is provided an improved priority control arrangement for selecting one of a plurality of keyboards which may simultaneously request service and in which service is provided on a demand basis from the terminals. In the preferred embodiment herein described by way of illustration, each terminal device includes a keyboard, a cathode ray display and an associated storage medium such as a delay line buffer. These keyboards generate binary coded digital signals, hereinafter designated BCD signals, which are applied together with decoded video representations thereof to the recirculating delay line buffer which operates as a cyclic closed loop to control the deflection system of the associated CRT display to generate and reintensify the keyboard selected symbols as a raster of spots on a 5 x 7 dot matrix. The BCD information defining each symbol comprises a six bit word, bits 2 through 7, while the associated video signals comprise five 7 bit words. Each delay line includes a single marker bit, designated TIC, which perform various control functions including identification of the location of incoming information, and is normally stored in the delay line in the first bit location of the BCD signal representative of the last received video symbol. The delay line is periodically sampled during the first bit time of each BCD symbol to detect the TIC, and detection is indicated by a TIC found signal. The TIC found signal can occur at any TIC sample time. In the preferred embodiment herein described, all keyboards are assigned an arbitrary number, and the keyboards are divided into two groups designated Odd and Even by the assigned numbers. It should be understood, however, that the principles of the present invention are applicable to larger number of groups of varied capacity, but for purposes of clarity are described relative to two groups of four keyboards each. A separate priority chain is established for each group, with the lowest numbered keyboard in each group being arbitrarily assigned the highest priority. This keyboard precedence is modified, however, by using the TIC associated with each keyboard to finally decide which keyboard is accorded service. Only in the situation where two TIC's occur simultaneously does the assigned precedence of the keyboard determine which is serviced.

When a keyboard symbol is depressed, a signal designated "strobe" is generated by the keyboard, and this is logically combined with the TIC of the associated delay line so that service is provided on a demand or request basis from the terminal rather than being assigned service in a predetermined sequence. Each keyboard has an assigned identification number or address indicating the group (Odd or Even) with which the keyboard is associated. When two or more TICs from associated keyboards request service simultaneously, the keyboard with the lower identification number will control. In this manner, a higher priority keyboard is prevented from controlling the common composer during a lengthly TIC search whenever a lower priority keyboard has also requested service and its TIC is more immediately available. Thus greater efficiency is afforded because data is transmitted by each keyboard on a single symbol basis, and the lower priority keyboard in the above example may complete its service before the higher priority keyboard's TIC is found.

Accordingly, a primary object of the present invention is to provide an improved priority system.

Another object of the present invention is to provide an improved terminal priority system wherein service is accorded to a terminal on a demand basis from the terminal.

Still another object of the present invention is to provide an improved keyboard priority system wherein service is allocated to a specified keyboard by a combination of a keyboard request signal and an asynchonous control signal.

A further object of the present invention is to provide an improved priority system in which service is accorded to display terminals on a demand basis by logically combining a keyboard request signal with a randomly located control signal in the associated delay buffer, the system including provision for assigning service on a predetermined priority when the service request and control signals occur simultaneously.

The foregoing and other objects, features and advantages of the invention will be apparent from the following more particular description of a preferred embodiment of the invention as illustrated in the accompanying drawings.

Figures 1, 4:
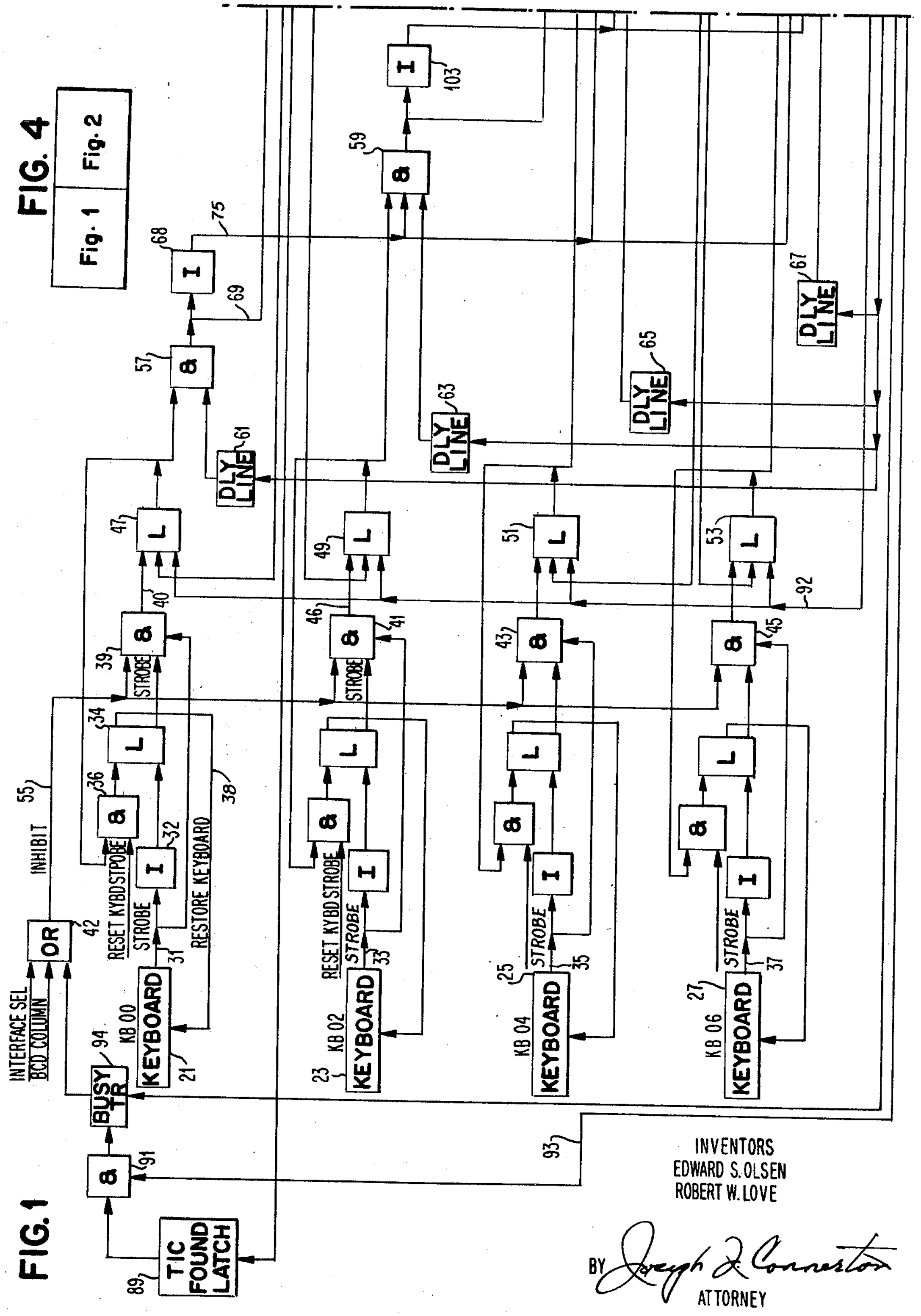
FIGURES 1 and 2 illustrate in logical block form a preferred embodiment of the present invention when interconnected as shown in FIGURE 4.

Before proceeding with a description of the instant invention, the environmental display system with which the present keyboard priority system is associated will be briefly described. Terminal storage, as noted above, is required to store the video and BCD signals for character display and identification. Delay line cyclical buffer storage systems are particularly well suited for use in a cathode ray tube display where video signals must be stored and repetitively supplied to the display tube. The relationship between the length of the delay line, the repetition rate of a recirculating buffer and the characteristics of the phosphor of the display CRT in providing a substantially flicker-free display are known in the art and are considered beyond the scope of the present invention, and accordingly, details relating thereto are omitted from the ensuing description. In the interest of clarity, it will be assumed that the delay line buffer is sequentially recirculated at an interval consistent with the performance of the system to provide a substantially flicker-free display on the associated cathode ray tube. The environmental display system of the instant invention generates characters by selective unblanking during a high speed vertical sweep, and the display patterns for two displays designated Odd and Even are interleaved on a single delay line. Five vertical sweeps are required to generate one character or a column of up to twelve characters, and the single column space between characters, normally blanked, is used to store BCD information. The character information for two displays designated Odd and Even are interleaved so that the vertical strokes for one display are generated during the interval between rows on the other display and vice-versa. The environment system contemplates a display of rows of 40 characters per row on each display. Delay line storage units are designated slots, in which one slot represents the amount of storage space required for twelve seven bit signals which constitute one column of characters for an Odd display, and one column of characters for an Even display. Six slots interleaved in the delay line constitutes the coded representation of up to six characters per display or twelve characters in a vertical column and includes a BCD column associated with each character. A more detailed description of the use of delay lines as storage devices is found in copending application Ser. No. 553,494, "Reverse Scanning System" filed by Harvey E. Kronick et al., May 27, 1966. In addition, the use of a delay line buffer for a display system is described in U.S. Patents 2,601,289 to Hollabaugh, issued June 24, 1952, and 2,629,287 to Eckert, Jr., et al., issued Feb. 24, 1953. The development and use of delay lines is described in the 1949 Proceedings of the I.R.E., "Mercury Delay Line Memory Using a Pulse Rate of Several Megacycles" by Auerbach, Eckert, Jr., Shaw and Sheppard, pages 885–861. Each depression of a keyboard causes a "strobe" signal to be generated and the associated six bit BCD signal representative of the selected character is stored, decoded and its video representation stored adjacent thereto. A preferred system for decoding and generating video signals representative of a selected character is shown and described in copending application Ser. No. 496,016, "Character Code Translator" filed by Robert W. Love on Oct. 14, 1965. The present invention is adapted for use in conjunction with a data processing system, wherein service must also be allocated for data transmission between the display terminals and the data processor channel. However, for purposes of the instant invention, this will be indicated and described only in general terms to the extent necessary to adequately define the present invention.

Figure 2:
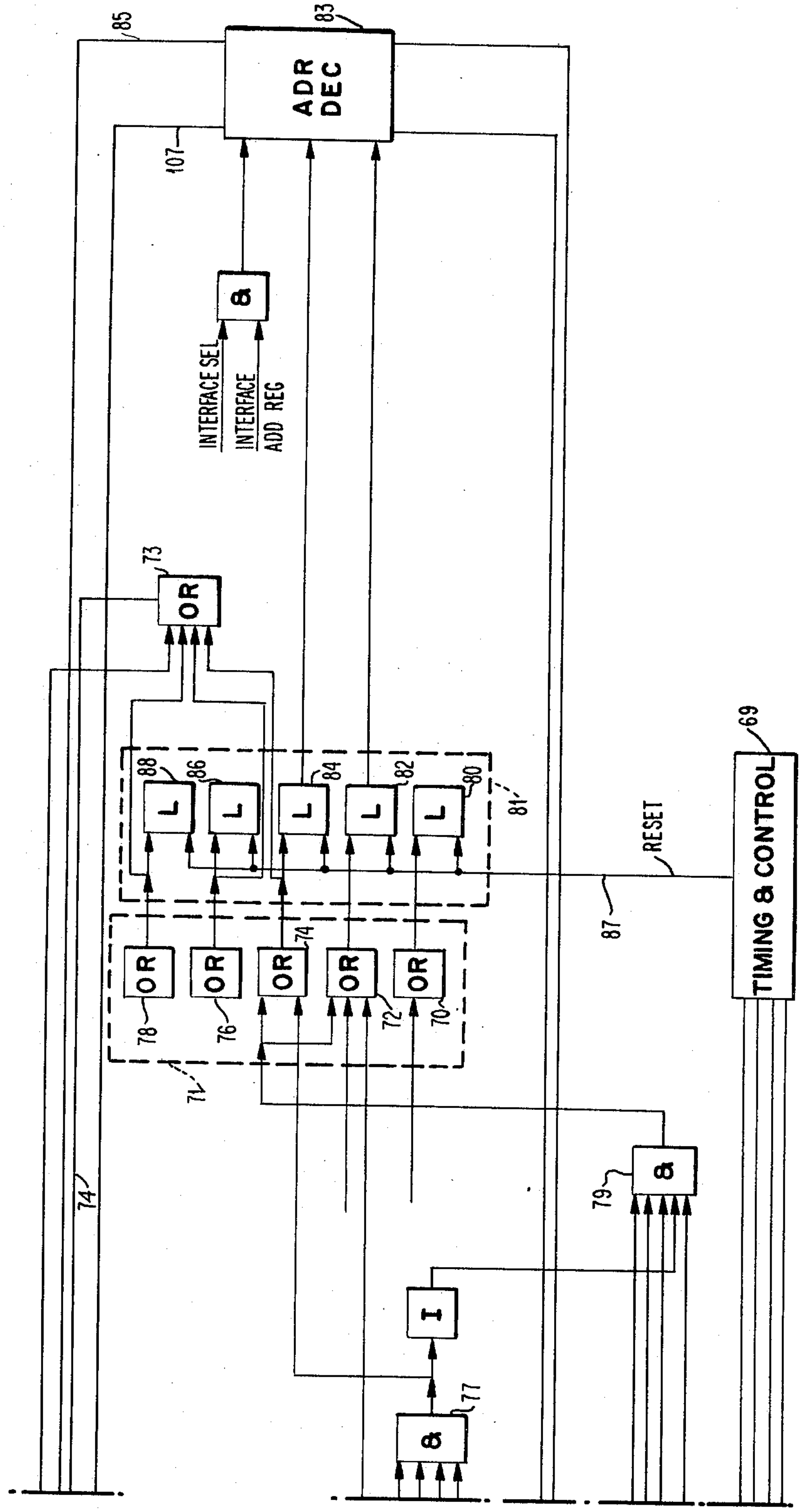
Figure 3:
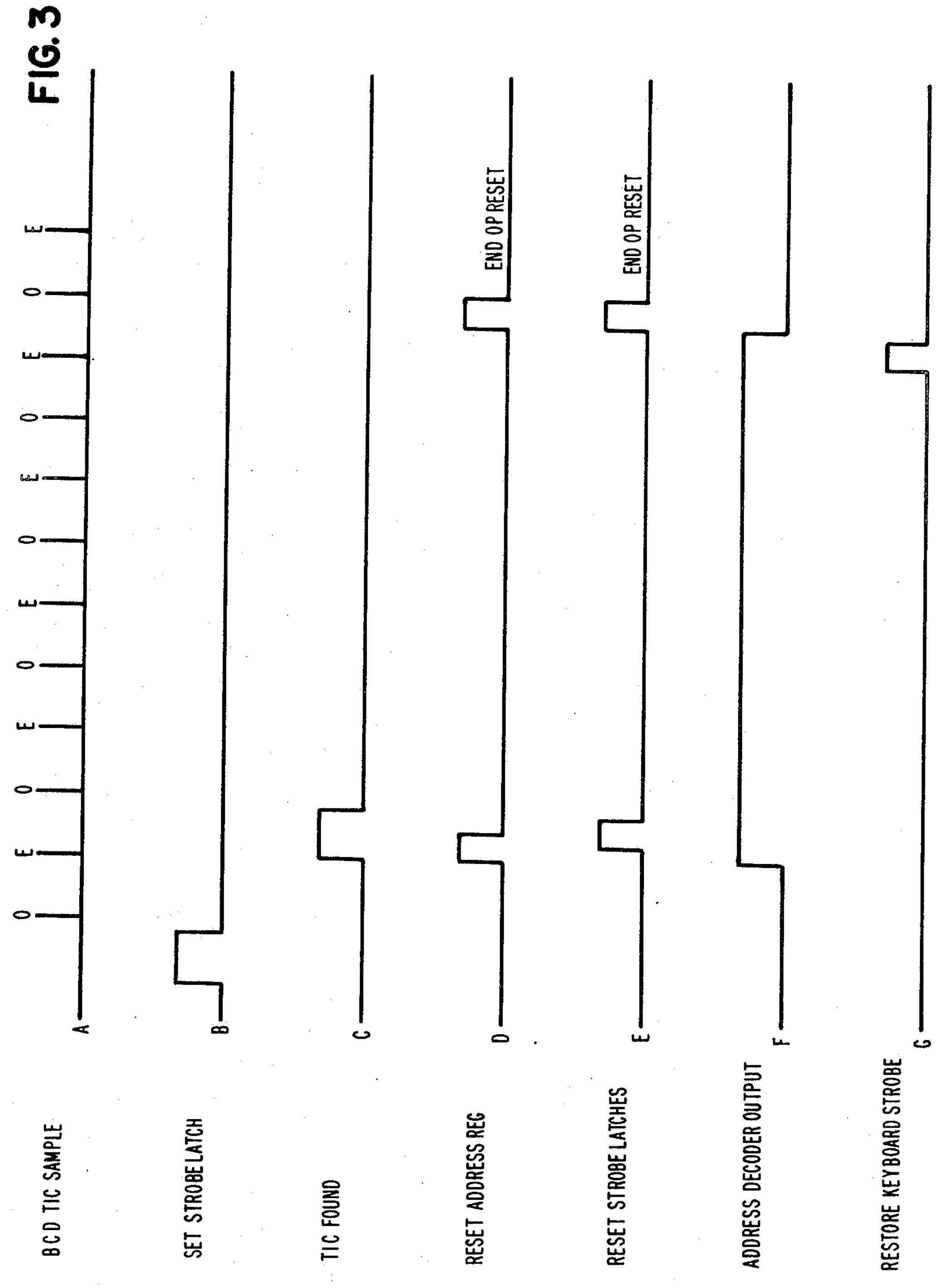
FIG. 3 is a timing diagram related to the components of FIGS. 1 and 2.

Referring now to the drawings and more particularly to FIGURES 1 and 2 thereof, there is illustrated in block logical form a preferred embodiment of the present invention. For clarity of description, the system in which the present invention is adapted to function is described as utilizing eight keyboards, which are divided into two groups designated Odd and Even by the assigned numbers. It will be appreciated, however, that the present invention is not so limited and is adapted to function with a larger number of groups of more or less terminals than the preferred embodiment herein described. Since the Odd and Even groups are substantially identical, only the Even group comprising keyboards designated 00, 02, 04 and 06 will be described as illustrative of the present invention, although it will be appreciated that a corresponding group of Odd keyboards designated 01, 03, 05 and 07 would have an identical priority chain and utilize the common symbol composer. Unless otherwise indicated, the present invention will be described in terms of positive logic in which the positive pulse or level represents the significant or binary 1 signal and reference may be made in the ensuing description to the timing diagram of FIGURE 3. The four keyboards shown 21, 23, 25 and 27 are adapted to generate, when a symbol key is depressed, a strobe signal on lines 31, 33, 35 and 37 respectively. These strobe signals in turn are applied to associated logical AND circuits 39, 41, 43 and 45, the outputs of which are respectively connected to strobe latches 47, 49, 51 and 53. The set strobe latch signal is shown in FIG. 3B and represents the first signal derived during the priority selection. An inhibit line 55, more fully described hereinafter, is connected as the second input to logical AND circuits 39, 41, 43 and 45.

OR circuit 42 is adapted to provide an inhibit signal on line 55, in response to the following conditions: (1) An interface select condition, on a line labeled "interface sel." indicates that the common interface to the computer or channel is busy and not available for servicing display terminals. (2) An input labeled "BCD column" is actuated during the time that BCD information is being read from the delay line. Since the TIC is associated with the BCD column in the delay line, this also represents the time when the TIC would be detected. The BCD column line is actuated during each sixth vertical sweep and functions to prevent a pulse sliver condition from coincidence of signal a strobe and a TIC found signal. Keyboard selection is therefore inhibited during BCD read time, i.e., the time when the TIC could be read from the delay line.

As previously described, TIC sampling occurs during the first bit position of each BCD word. Referring briefly to FIG. 3A, each positive signal corresponds to alternate Odd and Even BCD words. The Even TIC sampling would occur on the second, fourth, sixth, etc. BCD word. When the TIC is detected, a "TIC found" signal, as shown in FIG. 3C is generated, TIC found latch 89 is set, and logical AND circuit 91 is conditioned to turn the busy trigger 94 on. The TIC found latch, as the name implies, is a latch circuit associated with each display terminal which is set from the TIC pulse read out from its associated delay line to signify that the TIC signal has been detected. Latch circuits are described in "Digital Computer Components and Circuits" by R. K. Richards, published by D. Van Nostrand Co., Inc., copyright 1957, page 88. Since the busy trigger indicates that a TIC has been found and a keyboard selected, it is necessary to inhibit the non-selected logical AND circuits 39, 41, 43 and 45 in the keyboard selection circuitry until the selected keyboard has been serviced. The busy trigger is on only during the time required to write the keyboard symbol into the delay time.

The strobe line from each keyboard is also connected to an inverter circuit, which maintains the keyboard restore latches normally reset. For example, strobe line 31 from keyboard 21 is connected through inverter 32 to keyboard restore latch 34. Restore latch 34 is set or latched by logical AND circuit 36, which is conditioned by the reset output from a strobe latch 47 and a second input labeled reset keyboard strobe, a signal generated when a keyboard has been selected and the symbol accepted by the composer.

At the end of the keyboard entry, the keyboard restore latch 34 provides an output on line 38 labeled restore keyboard to release the keyboard for the next character entry. As shown in the drawing, each of the keyboards has a corresponding strobe entry, but the inhibit generated from logical OR circuit 42 is common to all keyboards including the selected keyboard.

Assuming that the common composer is not busy, the inhibit input on line 55 is up, thereby conditioning the associated AND circuits 39, 41, 43 and 45. Assume for purposes of illustration that keyboards 21 and 23, identified as KB 00 and KB 02, simultaneously request service. Strobe lines 31 and 33 are energized, thus conditioning their associated logical AND circuits 39 and 41, and causing an appropriate output signal to be applied via lines 40 and 46 to set strobe latches 47 and 49, thereby partially conditioning logical AND circuits 57 and 59. A group of cyclic delay line buffers, shown as blocks 61, 63, 65, 67 contain the TIC signal which is sampled and detected as described supra. Since the system is described with respect to the Even keyboard group, the associated TIC signals are designated Even TIC. In the illustrative operation described, the Even TIC pulse in delay lines 61 or 63 would normally be asynchronous, although both TIC's could occur simultaneously. Since the TIC signal identifies the location of incoming data, and since the delay lines would be synchronized by a master clock, the TIC signals could occur in synchronism where both buffers contain either no data or contain messages of equal length. Assuming that the Even TIC pulse from delay line 61 occurs first, logical AND circuit 57, previously conditioned by a strobe latch 47, provides an output via line 69 to logical OR circuit 73, which, as more fully described hereinafter, has its remaining inputs from the address encoder 71. The address encoder 71, comprising logical OR circuits 70, 72, 74, 76, 78 is adapted to convert the applied input signals to identify which of the associated keyboards is attempting to communicate with the common. However, since the decoded representation of the 00 keyboard would be a series of zeros, it bypasses the address encoder and address register and is connected directly to logical OR circuit 73. When the address register is reset, the address of 00 will be read out, identifying the 00 keyboard. The five bit address encoder 71 is adapted to handle up to 32 display terminals, 25 of which are used in the environmental system built in accordance with the instant invention. The resultant output from logical OR circuit 73 is applied back via line 74 to the TIC found latch 89, which causes the inhibit signal from line 55 to decondition the logical AND circuits associated with all keyboards. In the case of the 00 keyboard, the output from the address decoder on line 85 sets strobe latch 47 for the symbol transmission period. Thus, an output from logical OR circuit 73 indicates only that a TIC has been found while the address encoder and the address register identifies the specific keyboard with which the TIC is associated. This association is necessary, as will be clear from the ensuing description. The output from logical AND circuit 57 is also inverted by inverter 68 to generate a deconditioning level on line 75 which is applied to inhibit all lower logical AND circuits in the priority chain, i.e., logical AND circuits 59, 77 and 79.

While the keyboard 00 sequence described above is an exception, the remaining outputs from the address encoder 71 are connected to their associated stages of address register 81. The address register 81 comprises five latch circuits 80, 82, 84, 86, 88 representing respectively $2^0$, $2^1$, $2^2$, $2^3$ and $2^4$ stages, and accordingly has a capability of identifying 32 distinct addresses, sixteen Odd and sixteen Even, although only the 4 Even are described in the preferred embodiment. The output from logical AND circuit 59, representing the 02 keyboard, is connected through address encoder stage 72 to latch circuit 82 of the address register. The output from logical AND circuit 77, representing the 04 keyboard, is connected through the corresponding stage of the address encoder to latch circuit 84, while the output from logical AND circuit 79, representing the 06 keyboard, is connected through logical OR circuits 72 and 74 representing the $2^1$ and $2^2$ stages to latch circuits 82 and 84 respectively. Since the 00 keyboard is accorded service as previously described without going through the address encoder 71 or the address register 81, only those inputs and outputs to and from the address encoder and address register necessary to accord service to the 02, 04 and 06 keyboards are shown. An address in its narrowest sense is a number which represents a storage location in the main storage of a processor, and an address register is the means for storing the number in digital form until desired. Address registers are described in the above identified publication by R. K. Richards, pages 332–335. However, it is apparent that the number of keyboards serviced can be expanded to the maximum provided by the 5 stages, or even further expanded by the use of additional stages. The two outputs from the address register stages 82, 84 are shown, and these are connected to address decoder 83, which comprises a conventional digital decoder having a capacity corresponding to that of the address register. Decoders are one of the basic components in data processing systems and are available in various switching logic such as diodes, transistors, magnetic cores, etc. Diode switching circuits for example are described in Digital Computer Components and Circuits by R. K. Richards, copyright 1957 by D. Van Nostrand Co., Inc., chapter 2, pages 36–62. Each of the four outputs is connected back to set or lock its associated strobe latch for the character transmission period. Each output from the address encoder 71 as shown, is also connected to logical OR circuit 73, which responds to any input signal to set the TIC found latch 89 and generate the inhibit signal on line 55 as previously described.

After a character has been keyed in from keyboard 00 in the manner above described, a reset address register signal is generated on line 87 followed by a reset strobe latch signal on line 92 from the timing and control circuit 69. Since the timing and control circuit of a data processor is a highly complex device, a detailed showing and description has been omitted in the interest of avoiding unnecessary prolix. However, such details as are considered necessary for an understanding of the subject invention are described herein and shown in the timing diagram of FIGURE 5. Timing and control circuits are described in Arithmetic Operations in Digital Computers by R. K. Richards, published by D. Van Nostrand Co., Inc., copyright 1955, pages 337–341. The relative sequence of these strobe latches, except for that for KB 00, which is latched as above described, are reset. The relative sequence of the reset address register and reset strobe latch signals is shown in FIGURES 3D and 3E, which indicates that the initial shift of reset address register signal is substantially coincident with the TIC found signal, while the reset strobe is slightly behind that of the address register. The keyboard strobe input on line 33 to logical AND 41 is still present, since keyboard 02 has already requested service which was allocated to keyboard 00 as above described. When a TIC has been found and one of the keyboards selected for service as indicated by an output from logical OR circuit 73, the output from TIC found latch 81 was set to condition a logical AND circuit 91. Upon the occurrence of an appropriate timing pulse on line 93 from timing and control circuit 69, an output is provided from AND circuit 91 to set the busy trigger 94, which in turn causes the output from logical OR circuit 97 to be set at the inhibit level on line 55 in the manner previously described. When common control is again available, i.e., after keyboard 21 has been serviced, a keyboard reset strobe signal as shown in FIG. 3G will be generated to condition logical AND circuit 36, which sets the keyboard restore latch to provide a keyboard restore signal on line 38 to restore the character key in the 00 keyboard. When this is restored, on end operation signal, shown as the second signal in FIGURES 3D and 3E, resets the strobe latches and address register. The inhibit level on line 55 will be removed, the keyboard logical AND circuits 39, 41, 43, 45 conditioned and the output of logical AND circuit 41 will endeavor to set the KB 02 strobe latch 49, this representing the second attempt of keyboard 02 to obtain service. If the KB 02 strobe latch 49 is set, and the Even TIC pulse from delay line 63 is applied to logical AND circuit 59, this AND circuit 59 is conditioned to provide an output to OR circuit 72 representing the 02 stage of the address encoder 71. The output of AND circuit 59 is inverted by inverter 103 and applied to inhibit associated AND circuits 77 and 79 for keyboards 04 and 06, thereby preventing servicing of these keyboards. The keyboard 02 input to the address encoder 71 eventually produces through address register 81 and address decoder 83 the set keyboard KB 02 strobe latch signal on line 107 in the manner described above, which signal maintains the keyboard 02 strobe latch 49 in the set condition until the 02 keyboard has been serviced. At this time, the inhibit line 55 deconditions all strobe AND circuits 39, 41, 43 and 45 because common control is busy servicing keyboard 02. When the strobe latch reset occurs, all strobe latches except keyboard 02 latch 49 are reset, and the priority circuit is ready to receive subsequent service requests.

The operation of the priority system when two keyboards simultaneously request service and their Even TIC signals are simultaneously generated will now be described. Assuming that keyboards 21 and 23 simultaneously request service and that the common composer is not busy, the output from logical AND circuits 39 and 41 on lines 40 and 46 set their respective strobe latches 47 and 49, which in turn conditions their respective AND circuits 57 and 59. When the Even TIC signals from delay lines 61 and 63 occur simultaneously, the output from logical AND circuit 57, as previously described, is inverted by inverter 68 to decondition the logical AND circuit 59 associated with KB 02 as well as the lower priority keyboards KB 04 and KB 06. Since it is possible that a pulse splinter output could be provided from KB 02 through logical AND circuit 59 through the address encoder 71 to address register 81 before logical AND 59 is deconditioned by inverter 68, the output from the address encoder 71 is gated into the address register 81 in a timed sequence which allows the address encoder 71 to settle before transfer to the address register 81. Thus, the timing sequence ensures that the circuitry is settled and that the correct input to the address encoder 71, in the example herein described the signal from logical AND 57, is entered into the address register prior to any transfer. Since this represents a conventional transfer operation, the specific details relating thereto have been omitted from the drawings in the interest of clarity.

From the above description, it is apparent that the present invention provides a priority system having separate controls which are primarily keyed to service demands from the keyboards. Under the normal situation, the first service request would be honored. In those instances where two requests for service occur simultaneously, the keyboard whose TIC is located first is serviced. In those instances where both the service request and TIC occur simultaneously, service is awarded on a predetermined priority on the basis of address. It should be appreciated that the speed of operation of the instant system as compared to that of the keyboard operator is such that any delay in allotting service would not be apparent to the operator and the characters would be entered and the message composed at the normal operating speed of the operator.

In summary, the present invention provides a priority selection system which functions to accord service to the desired terminal on a demand basis from the terminal based on a fixed signal (strobe) and a variable signal (TIC). Provision is also made for priority selection should two or more TIC or strobe signals occur simultaneously. While the present invention has been described in a preferred embodiment relative to display terminals, the principle of the invention is applicable to various I/O devices other than keyboard display systems. Likewise the specific format employed herein could be varied in accordance with the application.

What is claimed is:

1. A priority selection system for allocating service to a plurality of terminal devices comprising in combination
   signal generating means associated with each of said terminal devices for generating a service request signal,
   each of said terminal devices including a cyclic storage device having a randomly located control signal positioned therein, and
   means for detecting the joint occurrence of said service request and said randomly located control signal to allocate service to the associated terminal device and inhibit service to the remaining devices until the selected device has been serviced.

2. A device of the character claimed in claim 1 wherein said terminal devices are divided into groups and each device within said group has an assigned address, and wherein service is allocated on the basis of address upon the conjoint occurrence of a service request and a control signal from a plurality of terminal devices.

3. A system of the type defined in claim 1 wherein said terminal device comprises keyboards adapted to generate a service request signal when a character key is depressed.

4. A system of the type claimed in claim 3 wherein said cyclic storage device comprises a recirculating delay line buffer and wherein said randomly located control signal comprises an index signal to identify the location of information therein.

5. A device of the character claimed in claim 3 wherein service is allocated among said keyboard devices on a single character basis.

6. A priority system for allocating service to a plurality of keyboard terminals on a demand-availability basis comprising in combination
   a plurality of keyboard terminals,
   a delay line buffer associated with each of said terminals,
   means responsive to depression of a key on said keyboards for generating a service request signal,
   means for storing a synchronizing signal in each of said delay lines at a position identifying the location of incoming information,
   a logic circuit associated with each keyboard device, said logic circuit being conditioned by said service request signal,
   means for detecting the synchronizing signal during each delay line circulation,
   means responsive to the first detected synchronizing signal from a plurality of keyboards requesting service for providing a second input to said associated logic circuit, and means responsive to the resultant output from said logic circuit for allocating service to said terminal for storing the coded representation of said symbol on said delay line and inhibiting service to the remaining terminals during said service allocation.

7. A priority system of the type defined in claim 6 wherein each terminal has an assigned address and upon simultaneous occurrence of service request and synchronizing signal readout from two or more terminals service is allocated on a fixed priority on the basis of terminal address.

No references cited.

DONALD J. YUSKO, Primary Examiner

U.S. Cl. X.R.

340—324